United States Patent [19]
Gjertz et al.

[11] 4,395,846
[45] Aug. 2, 1983

[54] ARRANGEMENT IN BOXES HOLDING CELLULAR COMPARTMENTS

[75] Inventors: Uno Gjertz, Åstorp; Bengt H. C. Håkansson, Bankeryd, both of Sweden

[73] Assignee: Munksjo AB, Sweden

[21] Appl. No.: 293,480

[22] Filed: Aug. 17, 1981

[51] Int. Cl.³ .............................................. A01G 9/02
[52] U.S. Cl. ............................................ 47/86; 111/2
[58] Field of Search ............................... 47/77, 84–87; 111/2–3

[56] References Cited

U.S. PATENT DOCUMENTS

| | | | |
|---|---|---|---|
| 1,959,139 | 5/1934 | Otwell | 47/77 |
| 3,164,507 | 1/1965 | Masuda | 47/77 X |
| 3,515,036 | 6/1970 | Oki et al. | 47/77 X |
| 3,757,468 | 9/1973 | Shirouzu | 47/85 |
| 4,242,161 | 12/1980 | Hulten et al. | 47/77 X |

FOREIGN PATENT DOCUMENTS

| | | | |
|---|---|---|---|
| 2725220 | 12/1977 | Fed. Rep. of Germany | 47/86 |
| 7705282 | 11/1977 | Netherlands | 47/86 |

Primary Examiner—Robert E. Bagwill
Attorney, Agent, or Firm—Kane, Dalsimer, Kane, Sullivan & Kurucz

[57] ABSTRACT

An arrangement in boxes holding cellular compartments intended to nurse preferably forest tree seedlings until they are ready to be transplanted. The cellular compartment walls consist of paper, pasteboard or similar material coated on one side with plastics. To make it practically possible to break up the individual cellular compartments to separate the seedlings grown therein, each row of cellular compartments on the transverse or lengthwise direction of the box is provided on both sides with a strip adhering to the sides of the row of cellular compartments. Said strips form separately continuous lengths from row to row of cellular compartments. To break up each individual cellular compartment in a row to separate the seedlings the strips are pulled out and apart.

3 Claims, 4 Drawing Figures

ARRANGEMENT IN BOXES HOLDING CELLULAR COMPARTMENTS

BACKGROUND OF THE INVENTION

The subject invention concerns an arrangement in boxes holding cellular compartments intended for nursing plants, primarily forest tree plants or seedlings. More precisely, the invention concerns an arrangement in boxes or containers of the kind wherein the cellular compartments have a parallelepipedon configuration and wherein the cellular compartment walls are positioned in parallel with the side walls of the container and are made of paper, pasteboard, cardboard or corrugated board which is coated on one side with a plastics material.

In cultivating and nursing forest tree seedlings in cellular compartments of the kind referred to, each cellular compartment is initially filled with peat which is wetted down, whereupon the box, together with the cellular compartments therein, is allowed to pass underneath a sowing machine seeding one seed in each compartment. The boxes holding the cellular compartments are then placed side by side in tents which are climatically controlled to allow the seeds to germinate and develop into seedlings.

When the seedlings in the cellular compartments, after transplant if necessary, are ready to be set out at the intended growing place, the boxes holding the cellular compartments are transported to e.g. a clearing. As mentioned above, one of the surfaces of the walls of the cellular compartments is plastic-coated, in order to prevent the root system of the plant in one cellular compartment from penetrating into and intertwinning with the root systems of neighbouring plants in adjacent cells. At this stage, the paper layer of the walls of the cellular compartments normally is entirely disintegrated whereas the plastics layer still remains intact or at least in a continuous condition. This is a disadvantage inasmuch as it makes it necessary to break up the cellular compartment walls, row by row, in order to separate each individual seedling and the associated substratum core from the plastic before the seedlings can be bedded out. When this work is finished, all that remains of the box holding the cellular-compartments is a heap of fragments of plastics, soiled with earth and peat, which have to be removed from the clearing when the bedding-out operation is completed.

In forest cultivation thousands of plants are transplanted at each planting site and it is therefore necessary that all the steps involved, including separation of the seedlings from their nursing pots—the cellular compartments—are carried out very rapidly. This being the case, the plastics layer of the cell walls therefore easily is insufficiently removed and parts of it may be buried in the ground around the seedling root and hamper the continued growth of the seedling.

The purpose of the subject invention is to provide a device in boxes holding cellular compartments according to which the problem outlined above is solved in a convenient and rational manner, resulting in quick and complete separation of the seedlings from their associated cellular compartment or pot as well as making it possible to carry out this separation in an automated manner.

SUMMARY OF THE INVENTION

The invention is characterised in that each row of cellular compartments in the lengthwise or crosswise direction of the box enclosing the compartments is provided on both sides with a strip adhering to the sides of the row of cellular compartments, said strips preferably made from plastics of a kind that is not quickly degradable, each one of said two strips forming separately a continuous length of strip extending from row to row of cellular compartments throughout the entire box, said strips arranged, immediately preceding or at the time of transplant of the seedlings in the cellular compartments, to be pulled apart so as to successively break up every individual cellular compartment of each row to free the substratum core with the seedlings nursed therein.

In accordance with a further characteristic of the invention, of the two strips on either side of one row of cellular compartments the first one that is positioned closest to the next row of cellular compartments, calculated from one of the walls of the box that is parallel with the rows of cellular compartments, forms a folded part upon its transition to said next row of cellular compartments, in that said first strip extends between one of the outermost cellular compartments of this row of cellular compartments and the adjacent wall of the box, said folded part of said strip abutting against the outer face of said outermost cellular compartment and rounding the outer corner of that cellular compartment, which corner faces the preceding row of cellular compartments, whereas the second one of said strips extends externally of said folded part of the first strip and around the opposite outer corner of said outer cellular compartment.

BRIEF DESCRIPTION OF THE DRAWINGS

The invention will be described in closer detail in the following with reference to the accompanying drawings, wherein.

DETAILED DESCRIPTION OF A PREFERRED EMBODIMENT

Figure 1:
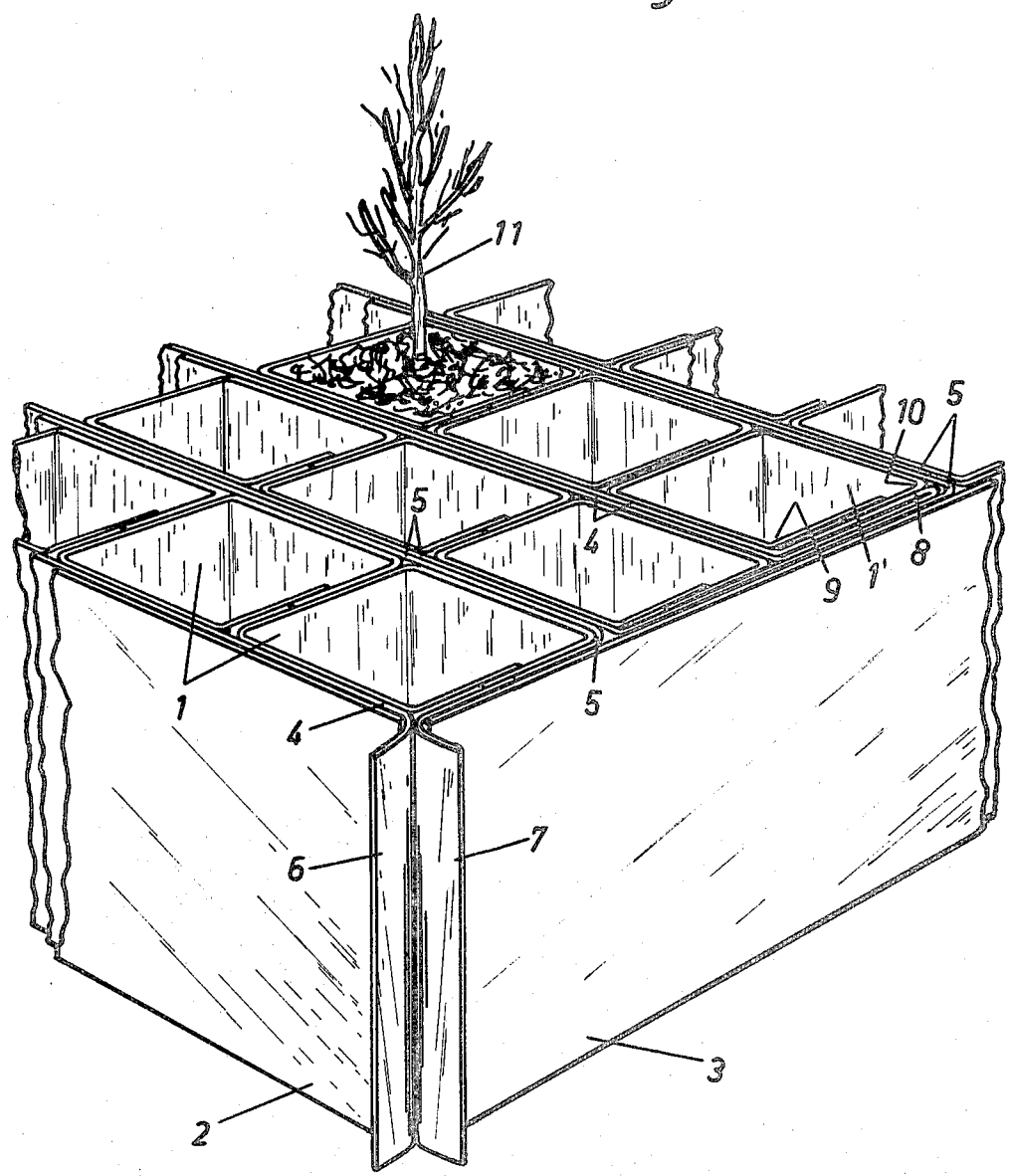
FIG. 1 is a perspective view showing a corner portion of a box holding cellular compartments.

The box holding cellular compartment is, generally speaking, manufactured in a manner known per se, each cellular compartment 1 comprising four walls made from paper coated on one side with plastics. Also paperboard, pasteboard or corrugated board could be used. The rows of cellular compartments are enclosed by external walls 2, 3 of pasteboard, giving rigidity to the box. The box has no bottom, and the cellular compartments 1 thus are open at their tops and bottoms.

The invention is characterised in that each row of cellular compartments, in either the lengthwise or the crosswise direction of the box, is provided on each one of its sides with a strip 4, 5 of plastics of a kind which is not easily degradable. The strips 4, 5 adhere to the lengthwise sides of the rows of cellular compartments and each one forms independently a continuous length extending from one row of cellular compartments to the next throughout the entire box.

At least at one of the corners of the box the ends of the strips 4, 5 project outside the corner, these ends thus forming gripping flaps 6, 7.

In the embodiment shown in FIG. 1, the box wall 2 is assumed to be one of the lengthwise sides of the box. The row of cellular compartments extending immediately inside and alongside this wall 2 thus forms the first row of cellular compartments. The strip 4 extends alongside the outwardly facing side of this first row of cellular compartments—that is, the side turned towards the external wall 2 of the box—whereas the strip 5 extends and abuts against the opposite, that is the inwardly facing side of this first row of cellular compartments. When the strips 4, 5 return (from the left-hand side of the box with regard to FIG. 1) they extend alongside mutually opposite sides of the second row of cellular compartments, but now it is strip 5 that extends along the outwardly facing side (turned towards box wall 2) of the second row of cellular compartments and strip 4 that extends alongside the opposite, that is the inwardly facing, side of the second row. The strips thus have changed positions. These alternate positions of the two strips are due to the fact that in accordance with a further characteristic of the subject invention the strip, 4 or 5, as the case may be, which is positioned closest to the immediately following row of cellular compartments, when passing to this row of cellular compartments, extend between one of the outermost cellular compartments 1' of this row and the immediately adjacent wall 3 of the box in the form of a folded part 8 and backs over in such a manner, that the folded part thus formed abut against the outer face of said outermost cellular compartment 1' and rounds the outer corner 9 of said cellular compartment 1' which corner 9 faces the preceding row of cellular compartments. The other strip 5—or strip 4, as the case may be—extends externally of the thus folded part 8 of the first strip (4 or 5) and rounds the opposite corner 10 of said outermost cellular compartment 1' of the row in question. The purpose of this arrangement will become apparent from the following.

Figure 2:
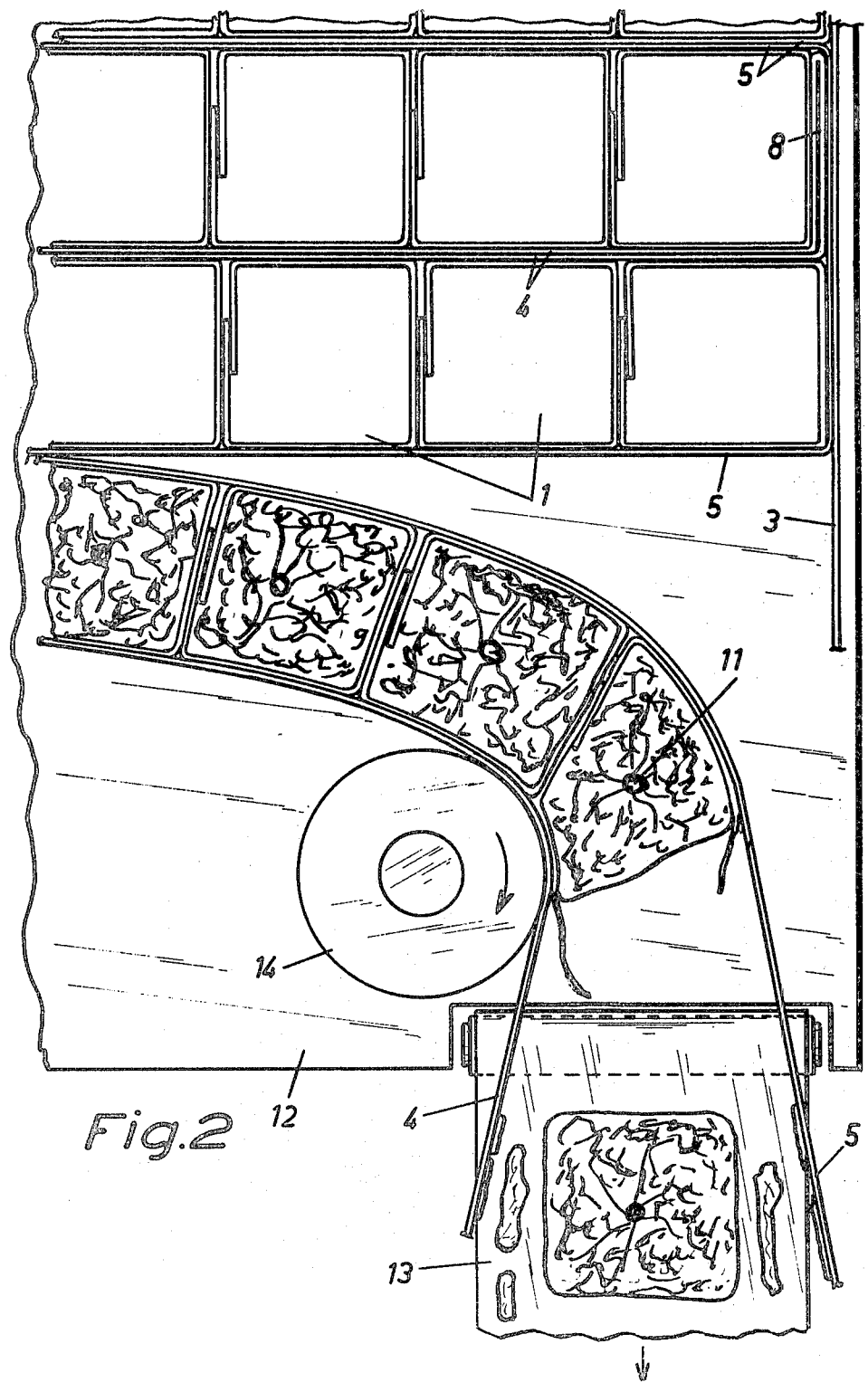
FIGS. 2 and 3 show a potion of the box of cellular compartments in a view from above, illustrating two different stages of pulling out a row of cellular compartments.

When seedlings 11 have been nursed in their individual cells of the box holding cellular compartments and it is time to bed them out or transplant them, the paper layer of the cellular compartment walls will have been completely, or nearly completely, decomposed through the decaying effects of the moist peat inside the compartments. However, the plastics coating still remains in the form of thin walls, preventing the root systems of plants in neighbouring cellular compartments from intertwinning. The strips 4 and 5 which are made a heavier plastics layer, will adhere to the thin plastic compartment walls with the aid of an adhesive. By pulling the grip flaps 6 and 7 and pulling the strips 4 and 5 apart, the cellular compartments of a row can be successively broken up and the seedlings together with their associated substratum core be freed. This procedure is illustrated in FIG. 2.

Figure 3:
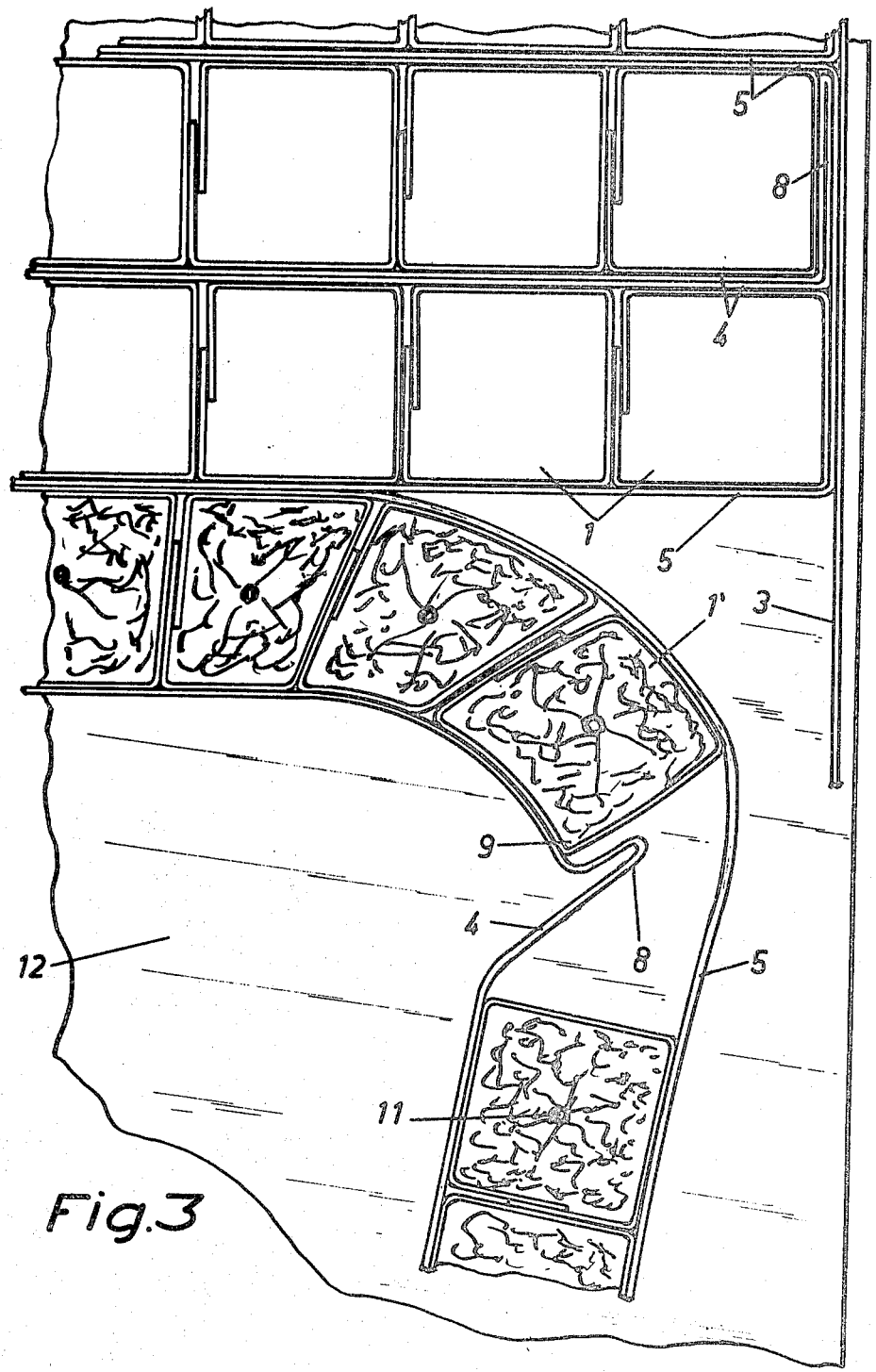

FIG. 3 shows the situation wherein the second cellular compartment row in succession—still calculated from the position in FIG. 1—has been completely pulled out and the first part of the third row of cellular compartments is being pulled out from the box of cellular compartments. Thanks to the provision of the folded part 8, extending as described in the aforegoing, it becomes possible to pull out the first outermost cellular compartment 1' of the next row of cellular compartments gently in a manner ensuring that this row can smoothly follow the preceding row of cellular compartments. Had the strip 4, instead of being arranged in the form of a folded part in accordance with the invention, been allowed to back over at the point formed by the corner 9, the cellular compartment 1' would have been heavily deformed during the pulling-out of the row of cellular compartments, which would have been detrimental to the seedling in that cellular compartment.

Figure 4:
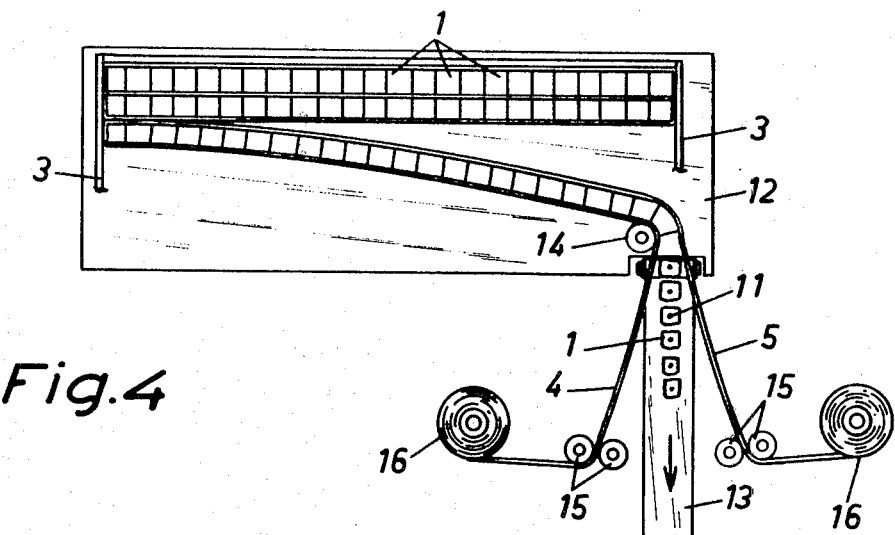
FIG. 4 is a plan view of a machine designed to handle seedlings freed of their enclosing cellular compartments.
Figure 4:
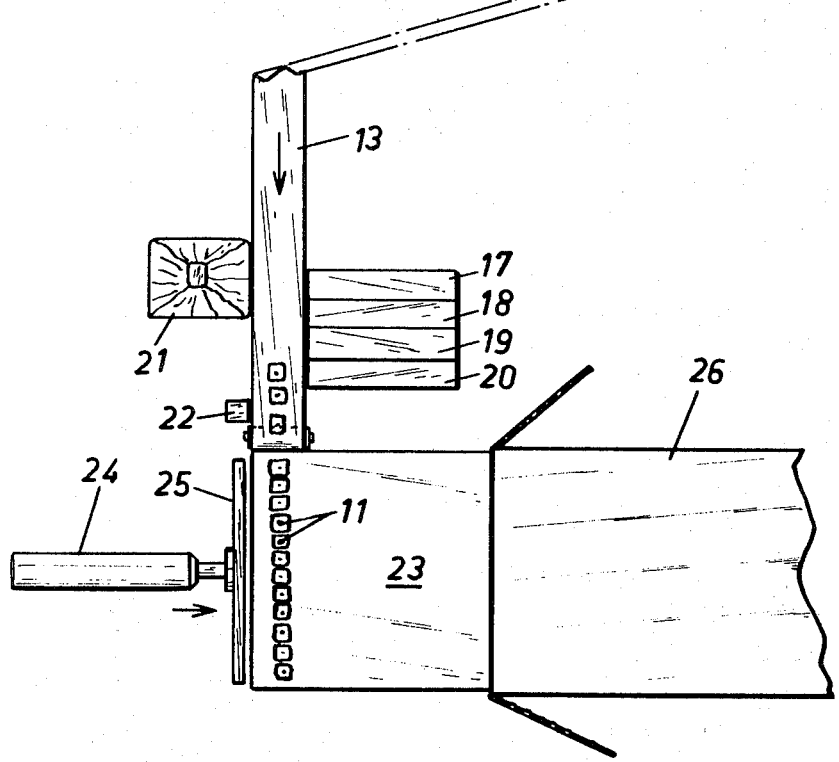

FIG. 4 illustrates an apparatus in which the new arrangement in boxes holding cellular compartments in accordance with the invention may be utilized in a very efficient manner. The box of cellular compartments is advanced into a table 12 at one corner of which is provided a conveyor means 13. Closely adjacent the latter is provided a horisontally rotating guide roller 14 which is arranged to facilitate the pulling-out of the rows of cellular compartments. On either side of the conveyor means 13, at some distance from the table 12, are positioned clamping rollers 15 which operate in pairs and between which travel the strips 4, 5. Adjacent each one of each pair of clamping rolls is provided a winding-on drum 16, one designed to receive the strip 4 thereon and the other the strip 5.

The winding-on of the strips 4, 5 on the drums and the breaking-up of the cellular compartments 1 may be effected in a contiuous manner and the thus successively freed seedlings 11 be fed onto the conveyor means 13, past several stations 17-20, which are only schematically indicated in the drawing. For instance, in station 17 the so-called "zero pots," that is pots in which the seed seeded therein never germinated, are removed. In station 18 the seedlings are analysed as to quality, in station 19 the seedling height is controlled and in station 20 is effected a further check of the seedlings.

At the opposite side of the conveyor means 13 is positioned a box for collection of "zero pots" and at the same side of the terminal end of the conveyor is provided a counter means 22.

From the conveyor means 13 is dispensed accepted plants 11 that meet the required standard and are fed onto a table 23 at one of the short sides of which is provided a pusher means 25 which is arranged to perform a to and fro motion by means of a piston cylinder 24. At the opposite end of the table is positioned a box 26 which is open at one of its short sides.

When the counter 22 has registered that a predetermined number of accepted plants 11 have been passed onto the table 23, the pusher 25 is set in motion and displaces laterally a row of plants across the table surface. When a predetermined number of rows of plants corresponding to the size of the box 26 have been positioned on the table 23, all the plants are pushed into the box 26 and the latter is closed. The boxes 26 thus filled are then transported to the intended place of transplant of the seedlings, for instance a forest clearing, to be bedded out. The transplant operation may be carried out considerably quicker and more efficiently than has hitherto been possible, since the plants are separated from one another and are no longer enclosed in a plastics layer that has to be removed and collected. Nor is there any risk that the seedlings will be bedded out with the plastics layer still adhering to the root system of the seedlings.

The invention is not limited to the embodiment as shown and described in the aforegoing but various modifications are possible within the scope of the appended claims.

What we claim is:

1. In an arrangement in cornered boxes for holding cellular compartments intended for nursing plants, primarily forest tree seedlings potted in a substratum core, said boxes being defined by sidewalls, adjacent sidewalls being joined at a corner of the box, said cellular compartments having walls of a parallelepipedon configuration, the walls of said cellular compartments having inner and outer surfaces and being positioned parallel with the sidewalls of said boxes and made of paper, pasteboard, cardboard or corrugated board coated on one surface with a plastic material, the improvement comprising;

said cellular compartments being arranged in rows inside said box;

a plurality of strips made of a plastic which is resistant to degradation by contact with moist peat, said strips being arranged to extend along two opposite sides of each cellular compartment in a row, each of said strips forming separately a continuous length of strip from row to row of cellular compartments throughout the entire box, said strips being adhered to the walls of the cellular compartments in the rows so that adjacent strips may be pulled apart so as to successively break up every individual cellular compartment of each row to free the substratum core with the seedlings nursed therein.

2. An improved arrangement as claimed in claim 1, the improvement further comprising a pair of gripping flaps formed by extended ends of adjacent strips, said gripping flaps projecting somewhat beyond at least one of the corners of said box holding said cellular compartments to form easily accessible pulling tabs.

3. An improved arrangement as claimed in claim 1 wherein of said adjacent strips on either side of one of said rows of cellular compartments, the strip that is positioned closest to the next adjacent row of cellular compartments, determined from a wall of said box that is parallel with said rows of cellular compartments, has a folded part at its transition to said adjacent row of cellular compartments, and extends between one of the outermost cellular compartments of said row of cellular compartments and the adjacent wall of said box, said folded part abutting against the outer face of said outermost cellular compartment and rounding the outer corner of the associated cellular compartment, said corner being the compartment corner facing the preceding row of cellular compartments, and the other of said adjacent strips extending externally of said folded part and around the opposite outer corner of said outer cellular compartment.

* * * * *